Jan. 3, 1939. Z. RIDDLE 2,142,699
AIRCRAFT WING HEATING MEANS
Filed Sept. 27, 1937

INVENTOR.
Zelie Riddle
BY A. B. Bowman
ATTORNEY.

Patented Jan. 3, 1939

2,142,699

UNITED STATES PATENT OFFICE 2,142,699

AIRCRAFT WING HEATING MEANS

Zelie Riddle, San Diego, Calif.

Application September 27, 1937, Serial No. 165,940

8 Claims. (Cl. 244—134)

My invention relates to a means for heating aircraft wings for preventing the formation of ice on the aircraft wings, and the objects of my invention are:

First, to provide a means of this class which utilizes the exhaust heat from the engine and conducts it along the leading edge or more exposed portion of the wings for heating the same;

Second, to provide a means of this class with a heat distributing means that are broad and shallow so that the heat is conducted over a large surface of the area of the wing;

Third, to provide a means of this class with means for circulating the heat over a large area of the wing surface of both the upper and lower sides;

Fourth, to provide a means of this class which provides a large surface area distribution of the heat by conduction from the exhaust manifold of the engine;

Fifth, to provide a means of this class in which the conducting means and distributing means may be used for re-inforcing the wing structure and as a wing skin support;

Sixth, to provide a novel distributing means for heat by conduction from the exhaust manifold of the gas engine;

Seventh, to provide a means for distributing the heat which distributes the heat by conduction from the exhaust manifold over the most vital and exposed areas of the wing;

Eighth, to provide a means of this class which is very simple and economical of construction, easy to apply, economical in its application, efficient in its action, and which will not readily deteriorate or get out of order.

Figure 4:
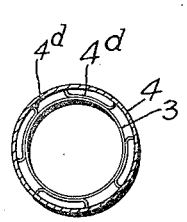
Figure 5:
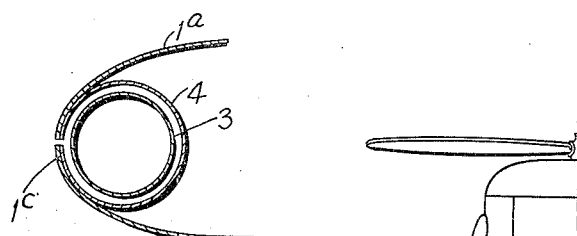
Figure 1:
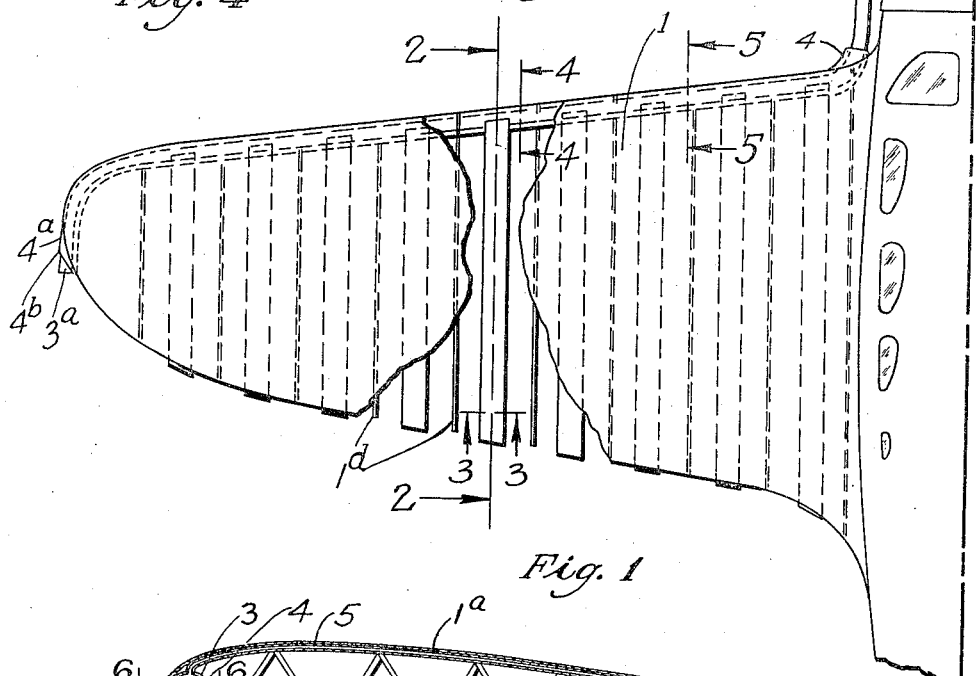
Figure 2:
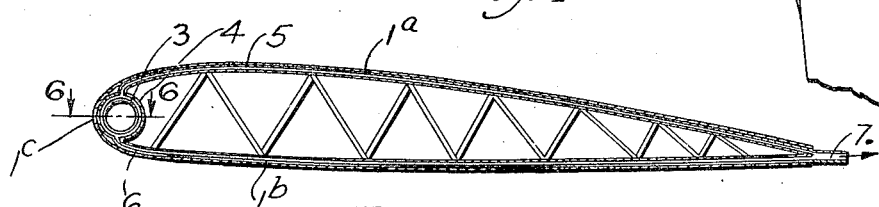
Figure 3:
Figure 6:
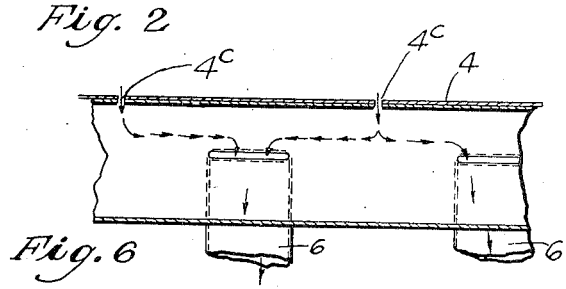

With these and other objects in view as will appear hereinafter, my invention consists of certain novel features of construction, combination, and arrangement of parts and portions as will be hereinafter described in detail and particularly set forth in the appended claims, reference being had to the accompanying drawing, and to the characters of reference thereon which form a part of this application in which:

Figure 1 is a top or plan view of an airplane wing showing fragmentarily substantially one-half of the fuselage in connection therewith and showing a portion broken away to facilitate the illustration; Fig. 2 is a sectional view of the wing structure on an enlarged scale taken from the line 2—2 of Fig. 1; Fig. 3 is an enlarged sectional view taken from the line 3—3 of Fig. 1; Fig. 4 is an enlarged sectional view taken from the line 4—4 of Fig. 1; Fig. 5 is an enlarged sectional view taken from the line 5—5 of Fig. 1; and Fig. 6 is an enlarged sectional view taken from the line 6—6 of Fig. 2.

Similar characters of reference refer to similar parts and portions throughout the several views of the drawing.

The wing member 1, exhaust manifold 2, exhaust conducting tube 3, exhaust conducting tube casing 4, heat distributing conductors 5 and 6, and heat distributing conductor outlets 7 constitute the principal parts and portions of my aircraft wing heating means.

The wing member 1 may be of any shape or form desired and is preferably of the conventional air foil cross section. It is provided with an upper preferably metallic skin portion 1a and lower metallic skin portion 1b and it is preferred to carry these skin portions 1a and 1b around the front or leading edge portion of the wing, as shown in the drawing, the leading edge skin portion being designated 1c; and the wing structure is provided with conventional ribs 1d and with spars as desired. Mounted in the leading edge of the wing just under the skin portion 1c is an exhaust conducting tube casing 4 which extends from near where the wing connects with the fuselage at the front side and extends to the tip of the wing and extends around the tip at 4a and is open at the back side of the tip at 4b. Communicating with the upper side of this casing 4 and extending backwardly adjacent the skin portion of the wing 1 to the trailing edge are a plurality of heat distributing conductors 5, each of which is a relatively wide, shallow, tubular member as shown best in Fig. 3 of the drawing. These members 5 communicate at the trailing edge of the wing with a distributing conductor outlet 7 which extends slightly past the trailing edge of the wing, as shown best in Figs. 1 and 2 of the drawing. Communicating with the lower side of the casing 4 and extending backwardly adjacent to the skin portion 1b of the wing 1 are similar conductors 6 which also communicate at the trailing edge with the conductor outlet 7. These members 6 are similarly shaped to the members 5 and the members 5 and 6 form supports for the skin portions 1a and 1b between the ribs 1d and are preferably positioned centrally between said ribs, as shown best in Fig. 1 of the drawing. Positioned centrally and extending longitudinally in the casing 4 is the exhaust conducting tube 3 which is smaller in diameter than the casing 4, thereby providing a space between the members 3 and 4 so that heat by conduction passes through the wall of the member 3 into the space between the members 3 and 4. Positioned in the front skin portion 1b and in the front portion of the tube 4 are air inlet orifices 4c which provide means for circulating the heated air from the exhaust conducting tube 3 through the distributing conductors 5 and 6 and out at the outlet 7, the direction of circulation being shown by arrows in Fig. 6 of the drawing. Thus, it will be noticed that the air passes inwardly in these orifices 4c which are positioned intermediate the members 5 and 6 so that the air passes along in the space between the members 3 and 4 some distance longitudinally of said members, then passes outwardly through the members 5 and 6 to the trailing edge and out through the outlet 7, the members 5 and 6 being wide and shallow provide for great surface heating of the skin surfaces of the wings. The heat distributing conductors 5 and 6 are supported by the wing spars and ribs which form the framework of the wing and the skin consisting of the members 1a, 1b, and 1c, are supported by the exhaust conducting tube casing 4 and the heat distributing conductors 5 and 6, as well as the framework consisting of the ribs and spars of the wing structure. The members 3 and 4 are held in their spaced relation with each other by means of separator members 4d which are positioned in spaced staggered relation and secured to the member 3 which permits the circulation of heat longitudinally between the members 3 and 4 and around the same.

The operation of my aircraft wing heating means is as follows:

The exhaust from the gas engine passes through the exhaust manifold 2 which communicates directly with exhaust conducting tube 3, passing the exhaust gas along the leading edge of the wings of the aircraft and out at the end 3a. This heats the tube 3 and by conduction heats the air in the space between the tube 3 and the casing 4, thus providing the main portion of the heat along the leading edge of the wing from the fuselage to the tip of the wing. This heat between the members 3 and 4 is caused to circulate by reason of the air inlets 4c into the space between the tubes 3 and 4 then longitudinally between said tube members and out through the members 5 and 6 in spread relation to the trailing edge and out through the outlet 7, thus providing heat directly to the skin of the wing at both the upper and lower sides of the substantial portion of the upper and lower surfaces of the wings and providing a major portion of the heat around the leading edge both above and below.

Though I have shown and described a particular construction, combination, and arrangement of parts and portions, I do not wish to be limited to this particular construction, combination and arrangement, but desire to include in the scope of my invention the construction, combination, and arrangement substantially as set forth in the appended claims.

Having thus described my invention, what I claim as new and desire to secure by Letters Patent is:

1. In an aircraft wing heating means, an exhaust conducting tube positioned along the leading edge of the wing from the fuselage to the tip, a casing member positioned around said exhaust conducting tube in spaced relation with said exhaust conducting tube and forming the leading edge of the wing, and a plurality of spaced flat tubular members communicating with said casing at its upper and lower sides and extending adjacent the skin and extending backwardly to the trailing edge of the wing.

2. In an aircraft wing heating means, an exhaust conducting tube positioned along the leading edge of the wing from the fuselage to the tip, a casing member positioned around said exhaust conducting tube in spaced relation with said exhaust conducting tube and forming the leading edge of the wing, a plurality of spaced flat tubular members communicating with said casing at its upper and lower sides and extending adjacent the skin and extending backwardly to the trailing edge of the wing, and a plurality of spaced air inlet ports at the leading edge of the wing positioned intermediate said wide flat tubular members and communicating with the interior of said casing.

3. In an aircraft wing heating means, an exhaust conducting tube positioned along the leading edge of the wing from the fuselage to the tip, a casing member positioned around said exhaust conducting tube in spaced relation with said exhaust conducting tube and forming the leading edge of the wing, and a plurality of spaced flat tubular members communicating with said casing at its upper and lower sides and extending adjacent the skin and extending backwardly to the trailing edge of the wing, and a plurality of separator members interposed between said exhaust conducting tube and said casing in spaced relation.

4. In an aircraft wing heating means, an exhaust conducting tube positioned longitudinally in the leading edge of the wing and extending from adjacent the fuselage to and part way around the tip of the wing, and open at its extended end, an exhaust conducting tube casing positioned in spaced relation around said exhaust conducting tube and extending its full length and forming a part of the leading edge framework and re-inforcing of the wing, and wide flat heat distributing conductors communicating with the space between said exhaust conducting tube and said casing at their upper and lower sides, extending backwardly to the trailing edge of the wing.

5. In an aircraft wing heating means, an exhaust conducting tube positioned longitudinally in the leading edge of the wing and extending from adjacent the fuselage to and part way around the tip of the wing, and open at its extended end, an exhaust conducting tube casing positioned in spaced relation around said exhaust conducting tube and extending its full length and forming a part of the leading edge framework and re-inforcing of the wing, and wide flat heat distributing conductors communicating with the space between said exhaust conducting tube and said casing at their upper and lower sides, extending backwardly to the trailing edge of the wing, said heat distributing conductors forming a portion of the support for the aircraft wing skin at the upper and lower sides of said wing.

6. In an aircraft wing heating means, an exhaust conducting tube positioned longitudinally in the leading edge of the wing and extending from adjacent the fuselage to and part way around the tip of the wing, and open at its extended end, an exhaust conducting tube casing positioned in spaced relation around said exhaust conducting tube and extending its full length and forming a part of the leading edge framework and re-inforcing of the wing, wide flat heat distributing conductors communicating with the space between said exhaust conducting tube and said casing at their upper and lower sides, extending backwardly to the trailing edge of the wing, said heat distributing conductors forming a portion of the support for the aircraft wing skin at the upper and lower sides of said wing, and outlet means extending past the trailing edge of said wing and communicating with both the upper and lower heat distributing conductors at the trailing edge of the wing.

7. In an aircraft wing heating means, an exhaust conducting tube positioned longitudinally in the leading edge of the wing and extending from adjacent the fuselage to and part way around the tip of the wing, and open at its extended end, an exhaust conducting tube casing positioned in spaced relation around said exhaust conducting tube and extending its full length and forming a part of the leading edge framework and re-inforcing of the wing, wide flat heat distributing conductors in communication with the space between said exhaust conducting tube and said casing at their upper and lower sides, extending backwardly to the trailing edge of the wing, said heat distributing conductors forming a portion of the support for the aircraft wing skin at the upper and lower sides of said wing, outlet means extending past the trailing edge of said wing and communicating with both the upper and lower heat distributing conductors at said trailing edge of the wing, and means for circulating air through the space between said conductor and said casing and through said heat distributing conductors.

8. In an aircraft wing heating means, an exhaust conducting tube positioned longitudinally in the leading edge of the wing and extending from adjacent the fuselage to and part way around the tip of the wing, and open at its extended end, an exhaust conducting tube casing positioned in spaced relation around said exhaust conducting tube and extending its full length and forming a part of the leading edge framework and re-inforcing of the wing, wide flat heat distributing conductors communicating with the space between said exhaust conducting tube and said casing at their upper and lower sides, extending backwardly to the trailing edge of the wing, said heat distributing conductors forming a portion of the support for the aircraft wing skin at the upper and lower sides of said wing, outlet means extending past the trailing edge of said wing and communicating with both the upper and lower heat distributing conductors at said trailing edge of the wing, and means for circulating air through the space between said conductor and said casing and through said heat distributing conductors including a plurality of spaced air inlet ports at the leading edge of said wings extending from the exterior to the space between said exhaust conducting tube and said casing.

ZELIE RIDDLE.